(12) United States Patent
Meadowcroft et al.

(10) Patent No.: US 8,414,309 B2
(45) Date of Patent: Apr. 9, 2013

(54) RECEPTACLE FOR AN OPTICAL TRANSCEIVER MODULE FOR PROTECTING THE MODULE FROM AIRBORNE PARTICLES

(75) Inventors: David J. K. Meadowcroft, Santa Clara, CA (US); Seng-Kum Chan, San Jose, CA (US)

(73) Assignee: Avago Technologies Fiber IP (Singapore) Pte. Ltd, Singapore (SG)

( * ) Notice: Subject to any disclaimer, the term of this patent is extended or adjusted under 35 U.S.C. 154(b) by 4 days.

(21) Appl. No.: 12/772,462

(22) Filed: May 3, 2010

(65) Prior Publication Data

US 2011/0268397 A1   Nov. 3, 2011

(51) Int. Cl.
*H01R 4/38* (2006.01)
(52) U.S. Cl. .......................................... 439/71
(58) Field of Classification Search ............ 439/519, 439/521, 587, 588, 367, 373, 271; 385/53, 385/88, 92
See application file for complete search history.

(56) References Cited

U.S. PATENT DOCUMENTS

| | | | |
|---|---|---|---|
| 4,421,383 A | 12/1983 | Carlsen | |
| 4,506,938 A * | 3/1985 | Madden | 439/71 |
| 5,743,785 A | 4/1998 | Lundberg et al. | |
| 6,005,991 A | 12/1999 | Knasel | |
| 6,085,003 A | 7/2000 | Knight | |
| 6,442,323 B1 | 8/2002 | Sorosiak | |
| 6,488,026 B2 | 12/2002 | Lauer | |
| 6,502,999 B1 * | 1/2003 | Cohen et al. | 385/94 |
| 6,533,470 B2 * | 3/2003 | Ahrens | 385/88 |
| 6,543,940 B2 * | 4/2003 | Chu | 385/53 |
| 6,652,158 B2 * | 11/2003 | Bartur et al. | 385/92 |
| 6,731,516 B1 * | 5/2004 | Ma | 361/802 |
| 6,821,028 B2 | 11/2004 | Morris et al. | |
| 6,850,671 B2 | 2/2005 | Carnevale et al. | |
| 6,877,913 B2 * | 4/2005 | Goto | 385/88 |
| 6,886,988 B2 | 5/2005 | Brown et al. | |
| 7,245,813 B2 | 7/2007 | Brown et al. | |
| 7,280,732 B2 | 10/2007 | Granger et al. | |
| 7,288,756 B2 | 10/2007 | Sherrer et al. | |
| 7,296,935 B1 | 11/2007 | Childers et al. | |
| 7,364,373 B2 * | 4/2008 | Ishikawa | 385/92 |
| 7,367,719 B1 | 5/2008 | Liburdi | |
| 7,537,397 B1 | 5/2009 | Tsai | |
| 7,637,672 B1 * | 12/2009 | Li et al. | 385/92 |
| 7,766,558 B2 * | 8/2010 | Fukutomi | 385/88 |
| 7,841,777 B2 | 11/2010 | Howard et al. | |
| 7,918,671 B2 * | 4/2011 | Chen et al. | 439/70 |
| 8,032,003 B2 | 10/2011 | Childers et al. | |
| 8,035,973 B2 * | 10/2011 | McColloch | 361/709 |
| 8,047,856 B2 * | 11/2011 | McColloch | 439/71 |
| 8,052,334 B2 | 11/2011 | Childers et al. | |
| 8,081,470 B2 * | 12/2011 | Oki et al. | 361/715 |
| 8,104,973 B2 | 1/2012 | Howard et al. | |
| 2004/0096165 A1 | 5/2004 | Childers et al. | |

(Continued)

FOREIGN PATENT DOCUMENTS

| | | |
|---|---|---|
| CN | 201083853 Y | 7/2008 |
| JP | 2004-212847 | 7/2004 |

*Primary Examiner* — Chandrika Prasad

(57) ABSTRACT

A protective socket is provided for use with a parallel optical transceiver module. When the parallel optical transceiver module is seated within a receptacle of the protective socket, the side walls and bottom that define the receptacle of the protective socket protect the internal components of the parallel optical transceiver module from dirt, dust, gases, and other airborne matter.

27 Claims, 14 Drawing Sheets

U.S. PATENT DOCUMENTS

| | | |
|---|---|---|
| 2004/0157652 A1* | 8/2004 | Yamazaki ............... 455/575.3 |
| 2005/0153600 A1* | 7/2005 | Lu ............................. 439/607 |
| 2006/0115217 A1 | 6/2006 | Childers et al. |
| 2006/0115218 A1 | 6/2006 | Childers et al. |
| 2006/0210225 A1 | 9/2006 | Fujiwara et al. |
| 2008/0019700 A1* | 1/2008 | Minota ........................ 398/135 |
| 2009/0067849 A1* | 3/2009 | Oki et al. ................... 398/136 |
| 2009/0297159 A1 | 12/2009 | Margolin et al. |
| 2010/0135618 A1 | 6/2010 | Howard et al. |
| 2010/0202735 A1 | 8/2010 | Childers et al. |
| 2010/0215319 A1 | 8/2010 | Childers et al. |
| 2011/0206324 A1 | 8/2011 | Childers et al. |
| 2011/0207344 A1* | 8/2011 | McColloch ................... 439/78 |
| 2011/0229678 A1 | 9/2011 | Childers et al. |

* cited by examiner ized by receiving circuitry for demodulating and decoding the received optical data signals, and monitor photodiodes for monitoring the output power levels of the laser diodes. Parallel optical transceiver modules typically also include an optical subassembly having optical elements that direct the optical data signals produced by the laser diodes onto the ends of optical fibers and that direct optical data signals received over optical fibers onto the receiver photodiodes.

The laser diode driver circuitry is typically contained in an integrated circuit (IC) having electrical contacts pads that are electrically coupled by electrical conductors (e.g., bond wires) to electrical contacts pads of the laser diodes. The number of laser diodes that are included in a parallel optical transceiver module depends on the design of the module. A typical parallel optical transceiver module may contain six laser diodes and six receiver photodiodes to provide six transmit channels and six receive channels. A typical parallel optical transceiver module that has no receiver photodiodes (i.e., an optical transmitter module) may have, for example, twelve laser diodes for providing twelve transmit channels. The laser diode driver ICs that are commonly used in these types of parallel optical transceiver or transmitter modules generate large amounts of heat that must be dissipated in order to prevent the laser diodes from being adversely affected by the heat. Due to the large amounts of heat generated, the tasks associated with designing and implementing a suitable heat dissipation system are challenging.

In many parallel optical transceiver or transmitter modules, openings exist in the modules through which airborne dust, dirt, gasses, or other particulates may enter the module. Ingress of such airborne matter into the module can sometimes cause problems in the modules. For example, ingress of dust into a part of the module that contains the laser diodes can potentially block light output from the laser diodes or received by the photodiodes, which, in turn, can lead to performance issues. Some modules have relatively open designs that enable them to be assembled at lower costs and that facilitate the evaporation of moisture in the modules. Therefore, while an open module design provides certain benefits, such designs are susceptible to problems associated with the ingress of dust, dirt, gases and other airborne matter. In addition, some modules are required to pass mixed flow gas (MFG) tests, during which a module is placed in a chamber and exposed to aggressive chemical gases, such as fluorine and chlorine, for example. These gases can find their way into a module and erode metal components of the module (e.g., bond wires, conductors, etc.), thereby causing damage to the module that can lead to performance problems.

A need exists for a parallel optical transceiver module that has protection against ingress of airborne matter such as dust, dirt, gases, and other airborne particulates that can harm the parallel optical transceiver module.

SUMMARY OF THE INVENTION

The invention is directed to a protective socket for use with an optical transceiver module and a method for protecting the optical transceiver module from airborne particulates. The protective socket comprises a bottom and first, second, third, and fourth side walls. Each of the side walls has a first side that is in contact with the bottom and a second side that is parallel to the first side. The first side wall extends between the second a fourth side walls. The second side wall extends between the first and third side walls. The third side wall extends between the second and fourth side walls. The fourth side wall extends between the first and third side walls. The bottom has a bottom surface and a top surface. The combination of the side walls and the bottom of the protective socket defines a receptacle for holding an optical transceiver module.

The receptacle has a height that is approximately equal to a height of the optical transceiver module such that when the optical transceiver module is held within the receptacle, the side walls of the protective socket and the bottom of the protective socket prevent or restrict ingress of airborne particles into an interior portion of the optical transceiver module. A first array of electrical contacts is disposed on the bottom surface of the bottom of the protective socket. A second array of electrical contacts is disposed on the top surface of the bottom of the protective socket. Respective electrical contacts of the first array of electrical contacts are electrically coupled to respective electrical contacts of the second array of electrical contacts. When the optical transceiver module is held within the receptacle, respective electrical contacts disposed on a bottom portion of the optical transceiver module are in contact with respective electrical contacts of the second array of electrical contacts.

The method comprises providing a protective socket and inserting an optical transceiver module into the socket. The protective socket has first, second, third, and fourth side walls and a bottom that together form a receptacle having a height, a width and a length. The optical transceiver module has a height, a width and a length. The length and width of the receptacle are slightly greater than the length and width, respectively, of the optical transceiver module. The height of the receptacle is approximately equal to the height of the optical transceiver module.

In accordance with another embodiment, an external heat sink device and method are provided for protecting an optical transceiver module from airborne matter. The external heat sink device has a protective cover formed therein. The protective cover has first, second, third, and fourth side walls and a bottom. The bottom corresponds to a surface of the external heat sink device. The first, second, third and fourth side walls and the bottom define a receptacle having a length, a width and a height. When the external heat sink device is placed in contact with the optical transceiver module, the receptacle surrounds the optical transceiver module such that the side walls and bottom of the protective cover prevent or limit ingress of airborne particulates into an interior portion of the optical transceiver module.

The method, in accordance with this latter embodiment, comprises providing an external heat sink device having a protective cover formed therein, and placing the external heat sink device in contact with the optical transceiver module such that a receptacle of the protective cover defined by the first, second, third, and fourth side walls and the bottom surrounds the optical transceiver module to prevent or limit ingress of airborne particulates into an interior portion of the optical transceiver module.

These and other features and advantages of the invention will become apparent from the following description, drawings and claims.

DETAILED DESCRIPTION OF AN ILLUSTRATIVE EMBODIMENT

In accordance with the invention, a protective socket for use with a parallel optical transceiver module is provided. When the parallel optical transceiver module is seated within a receptacle of the protective socket, the side walls and bottom of the protective socket that define the receptacle protect the internal components of the parallel optical transceiver module from dirt, dust, gases, and other particulates. Prior to describing an illustrative embodiment of the protective socket, an illustrative embodiment of a parallel optical transceiver module with which the protective socket may be used will be described with reference to FIGS. 1-3. An illustrative embodiment of the protective socket and other features will then be described with reference to FIGS. 4-13.

Figure 1:
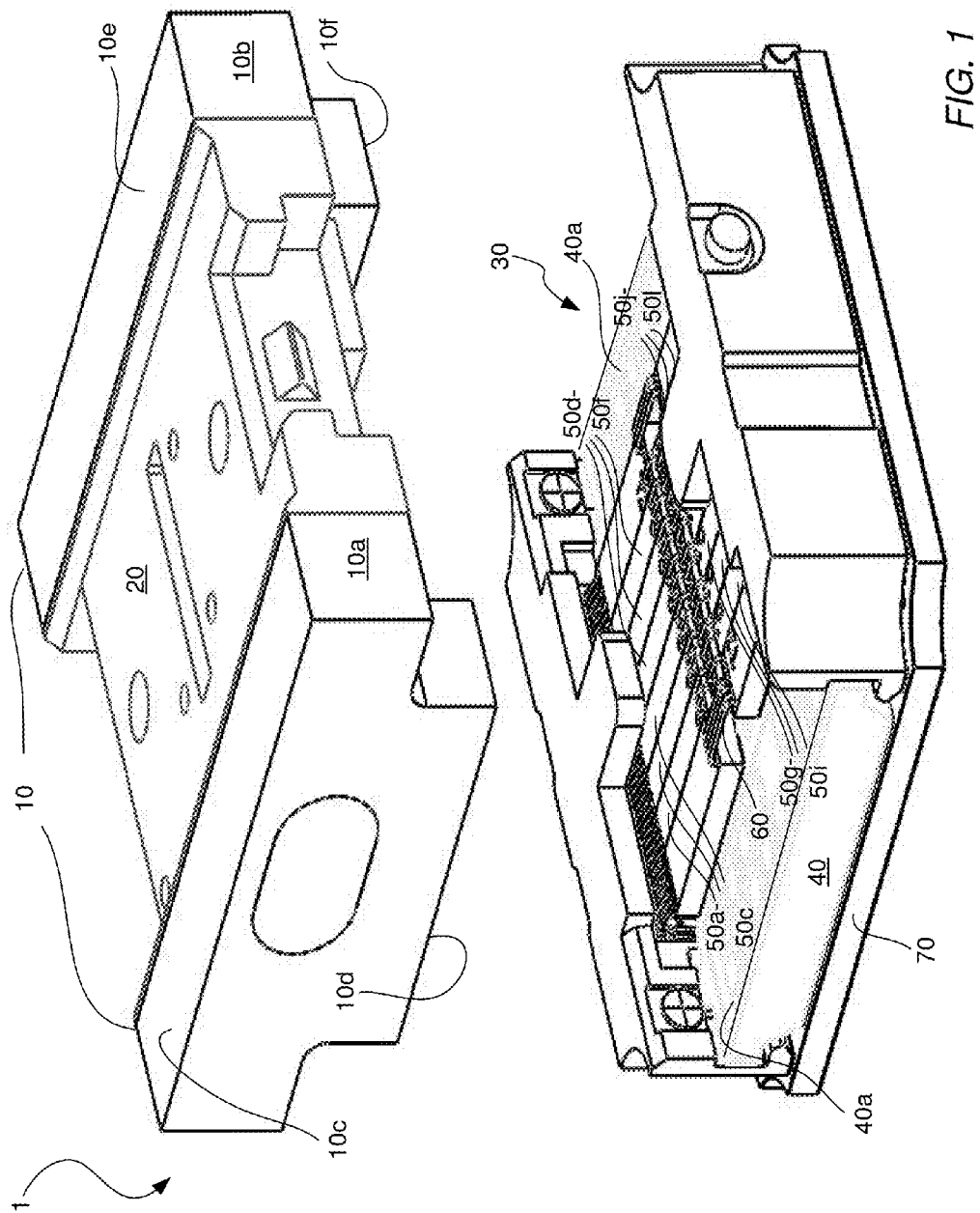
FIG. 1 illustrates a top perspective view of an illustrative embodiment of a parallel optical transceiver module that may be equipped with the protective socket.

FIG. 1 illustrates a perspective view of a parallel optical transceiver module 1 in accordance with an illustrative embodiment. The parallel optical transceiver module 1 includes a heat dissipation system 10, an optical subassembly (OSA) 20 to which the heat dissipation system 10 is mechanically coupled, and an electrical subassembly (ESA) 30 configured to be mechanically coupled to the heat dissipation system 10 and to the OSA 20. The heat dissipation system 10, in accordance with this embodiment, includes heat blocks 10a and 10b that are mechanically coupled to the sides of the OSA 20. The heat block 10a has an upper surface 10c and a lower surface 10d. Likewise, the heat block 10b has an upper surface 10e and a lower surface 10f.

The ESA 30 includes a leadframe 40 having an upper surface 40a on which a plurality of laser diode driver ICs 50a-50l are mounted. An array of laser diodes 60 is also mounted on the upper surface 40a of the leadframe 40. In accordance with this illustrative embodiment, the module 1 includes twelve laser diodes 60 for producing twelve optical data signals. When the OSA 20 having the heat dissipation system 10 secured thereto is attached to the ESA 30, the lower surfaces 10d and 10f of the heat blocks 10a and 10b, respectively, are in contact with the upper surface 40a of the leadframe 40, as will be described below with reference to FIG. 2. The OSA 20 is configured to receive an optical connector (not shown) that terminates an end of a twelve-fiber ribbon cable (not shown). The OSA 20 includes optical elements (not shown) for directing light produced by the twelve laser diodes onto the respective ends of twelve respective optical fibers of the ribbon cable.

Figure 2:
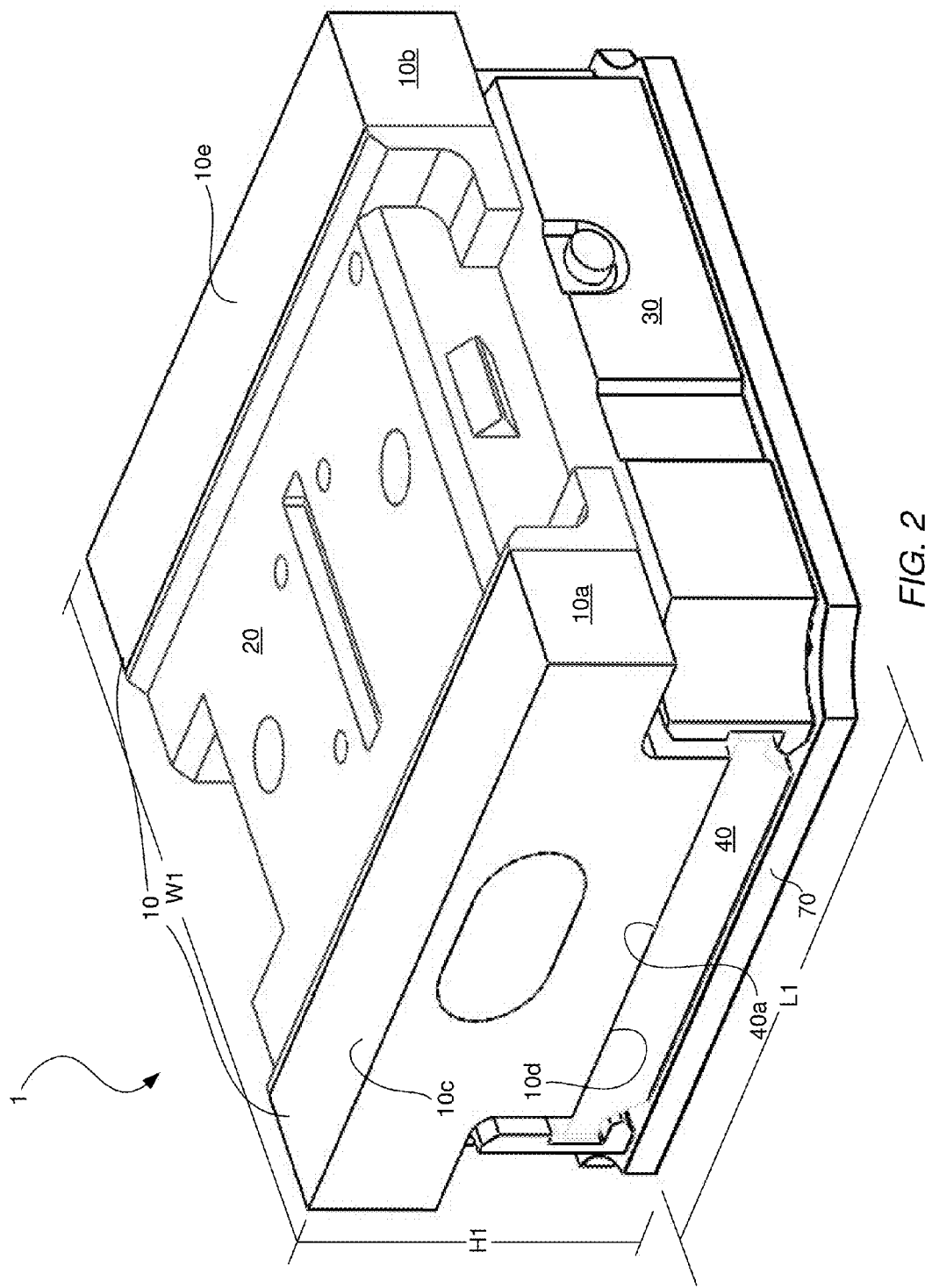
FIG. 2 illustrates a top perspective view of the parallel optical transceiver module shown in FIG. 1 after the heat dissipation system shown in FIG. 1 has been secured to the parallel optical transceiver module.

FIG. 2 illustrates a perspective view of the parallel optical transceiver module 1, which shows the heat dissipation system 10 secured to the OSA 20, and the combination of the heat dissipation system 10 and the OSA 20 secured to the ESA 30. In FIG. 2, the lower surfaces 10d and 10f of the heat blocks 10a and 10b, respectively, are shown in contact with the upper surface 40a of the leadframe 40. Typically, a thermally conductive attachment material, such as a thermally conductive epoxy, for example, is used to secure the lower surfaces 10d and 10f of the heat blocks 10a and 10b, respectively, to the upper surface 40a of the leadframe 40. The combination of the heat dissipation system 10 and the OSA 20 encapsulates the electrical circuitry mounted on the upper surface 40a of the leadframe 40. This encapsulation of the electrical circuitry (e.g., the laser diodes and laser diode driver IC) mounted on the leadframe 40 helps protect the electrical circuitry from dirt, dust and other particulates and from forces resulting from mechanical handling of the transceiver module 1. The encapsulation may be a semi-hermetic seal or it may be a seal having small openings (e.g., 1 to 200 micrometers in size) in it. The parallel optical transceiver module 1 has a height, H1, a width, W1, and a length, L1.

Figure 3:
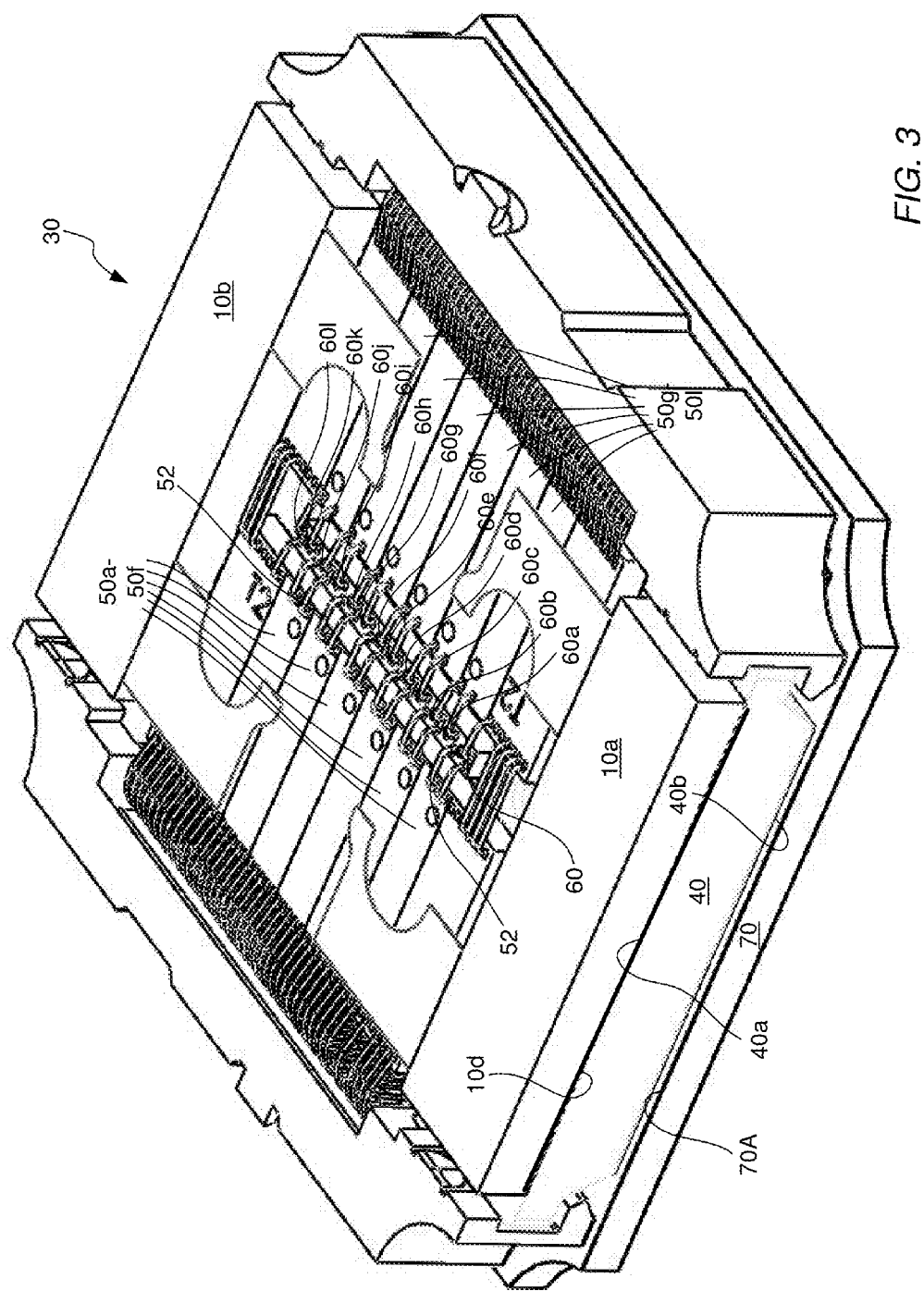
FIG. 3 illustrates a top perspective view of the parallel optical transceiver module shown in FIG. 2, which shows the lower surfaces of the heat blocks of the heat dissipation system secured to the upper surface of the leadframe of the optical transceiver module.

FIG. 3 illustrates a perspective view of the parallel optical transceiver module 1 shown in FIG. 2, but with the upper portions of the heat blocks 10a and 10b and the OSA 20 (FIGS. 1 and 2) removed to more clearly show the electrical circuitry mounted on the upper surface 40a of the leadframe 40. The parallel optical transceiver module 1 has only transmitter functionality and does not include receiver functionality. The module 1 includes twelve laser diode driver ICs 50a-50l and twelve laser diodes 60a-60l to provide twelve transmit channels. The laser diode driver ICs 50a-50l have driver pads (not shown) that are electrically coupled by wire bonds 52 to contact pads (not shown) of the laser diodes 60a-60l for delivering electrical signals to the laser diodes 60a-60l, such as the laser diode bias and modulation current signals. The laser diodes 60a-60l are typically vertical cavity surface emitting laser diodes (VCSELs) and may be integrated as an array into a single IC 60. The parallel optical transceiver module 1 also includes a circuit board 70, which is typically a ball grid array (BGA), a land grid array (LGA), or the like. The lower surface 40b of the leadframe 40 is secured to the upper surface 70a of the circuit board 70.

It should be noted that the invention is not limited with respect to the configuration of the parallel optical transceiver module 1. Although the module 1 shown in FIGS. 1-3 comprises only transmitter functionality, it may also include receiver functionality. For example, some or all of the laser diodes 60 may be replaced with photodiodes and a receiver IC may be added to the ESA or integrated with the laser diode driver ICs 50. The term "transceiver module", as that term is used herein, is intended to denote any of the following: (1) a module configured to transmit and receive signals, (2) a module configured to transmit signals, but not receive signals, and (3) a module configured to receive signals, but not transmit signals.

The OSA 20 (FIGS. 1 and 2) and the ESA 30 have alignment and locking features thereon (not shown) that align and interlock the OSA 20 and the ESA 30 to each other when they are coupled together. In this coupled state, the lower surfaces 10d and 10f of the heat blocks 10a and 10b, respectively, are in contact with the upper surface 40a of the leadframe 40. A variety of configurations of suitable alignment and locking features can be designed for mechanically aligning and interlocking the OSA 20 and the ESA 30 together, as will be understood by persons of ordinary skill in the art. Therefore, in the interest of brevity, a detailed discussion of the alignment and locking features will not be provided herein.

The thermal path for heat produced by the laser diode driver ICs 50a-50l (FIGS. 2 and 3) and the laser diode array 60 (FIG. 3) is as follows: from the laser diode driver ICs 50a-50l and from the laser diode array 60 down into the leadframe 40; from the upper surface 40a of the leadframe 40 up into the lower surfaces 10d and 10f of the heat blocks 10a and 10b, respectively; from the lower surfaces 10d and 10f of the heat blocks 10a and 10b to the upper surfaces 10c and 10e of the heat blocks 10a and 10b, respectively; and then from the upper surfaces 10c and 10e of the heat blocks 10a and 10b, respectively, into the customer's heat dissipation system (not shown).

The heat blocks 10a and 10b of the heat dissipation system 10 may be made of any thermally conductive material, such as copper, for example. In accordance with an embodiment, the heat blocks 10a and 10b are formed using a conventional blank stamping process. The blocks 10a and 10b are then nickel plated, which prevents the copper from oxidizing and prevents the copper atoms from migrating into the laser diodes 60a-60l. Other materials, such as aluminum nitride, for example, may also be used for the heat blocks 10a and 10b.

Figure 4:
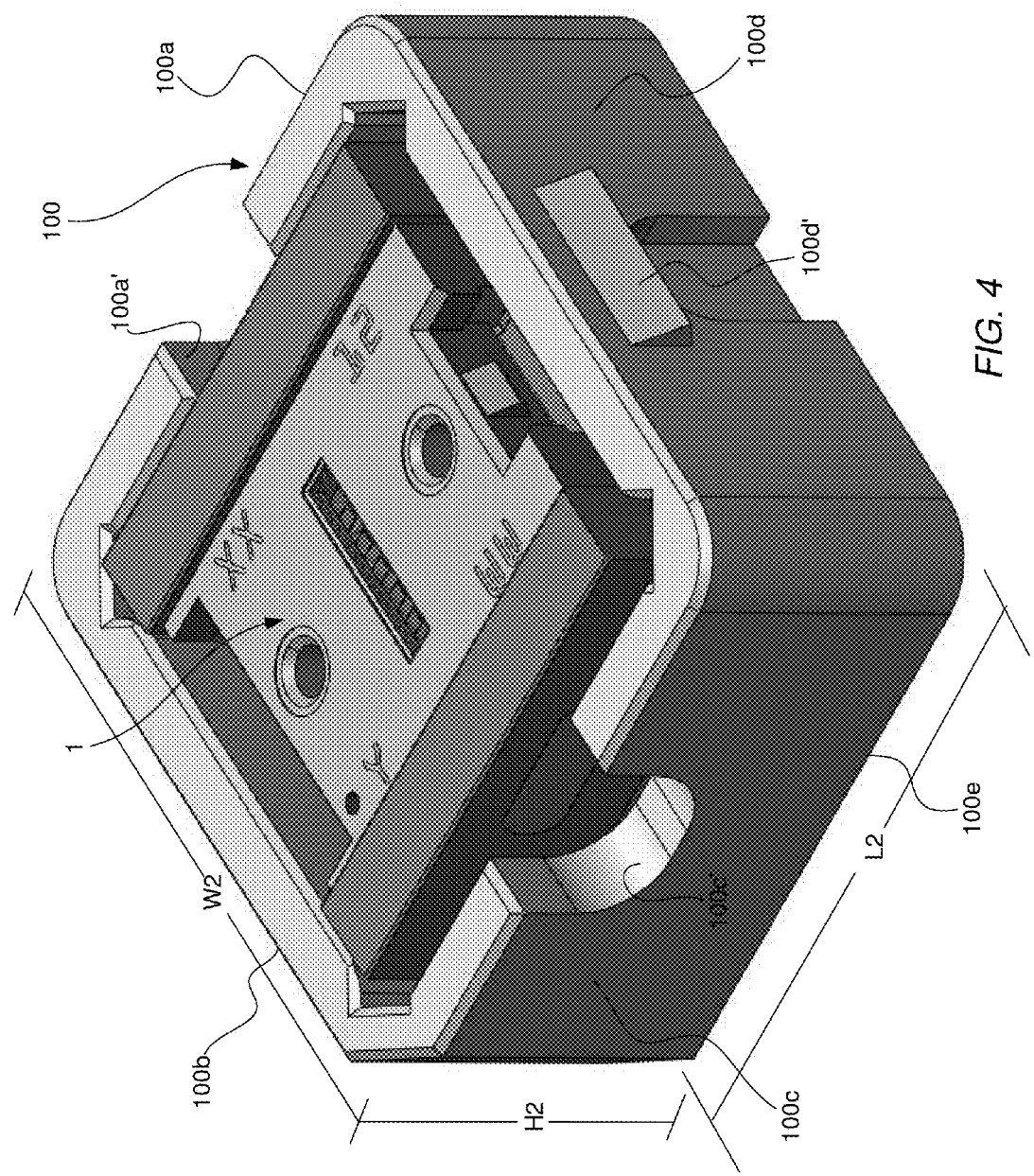
FIG. 4 illustrates a top perspective view of the parallel optical transceiver module shown in FIGS. 1-3 secured within the protective socket in accordance with an illustrative embodiment.

FIG. 4 illustrates a top perspective view of the parallel optical transceiver module 1 shown in FIGS. 1-3 mounted within a protective socket 100 in accordance with an illustrative embodiment. The protective socket 100 has four side walls 100a-100d and a bottom 100e. The side walls 100a and 100c have cutouts 100a' and 100c' formed therein, respectively, to allow the module 1 to be removed from the socket 100 through the use of a tool (e.g., tweezers or similar devices). The side walls 100b and 100d have latch features 100b' and 100d' formed thereon, respectively, that are configured to latch with interlocking features (not shown) formed on an external device, such as, for example, a clip (FIGS. 7-9), a heat sink device (not shown), or an optical connector device (not shown).

The receptacle of the protective socket 100 is defined by the side walls 100a-100d and by the bottom 100e. Each of the side walls 100a and 100c has a length, L2, and each of the side walls 102b and 102d has a width, W2. The length L2 and width W2 dimensions of the protective socket 100 are just slightly larger than the length L1 and width W1 dimensions, respectively, of the parallel optical transceiver module 1 (FIG. 2). The receptacle defined by the side walls 100a-100d has a height, H2, which is approximately equal to the height, H1, of the parallel optical transceiver module 1. Because the height H2 of the side walls 102a-102d is approximately equal to the height H1 of the parallel optical transceiver module 1 (FIG. 2), the module 1 is seated within the receptacle of the socket 100 in such a way that ingress of airborne dust, dirt and other matter into the interior of the module 1 is prevented or at least limited. This feature prevents airborne dust, dirt and other particulates from entering the portion of the module 1 in which the electrical and active optical components are mounted in the ESA 30 (FIG. 3), thereby substantially preventing these components from being harmed by airborne dirt, dust and other particulates. As will be described below in detail with reference to FIGS. 7-11, the module 1 may be provided with additional features that further ensure that ingress of airborne dust, dirt, gas, and other particulates into the interior of the module 1 is prevented.

Figure 5A:
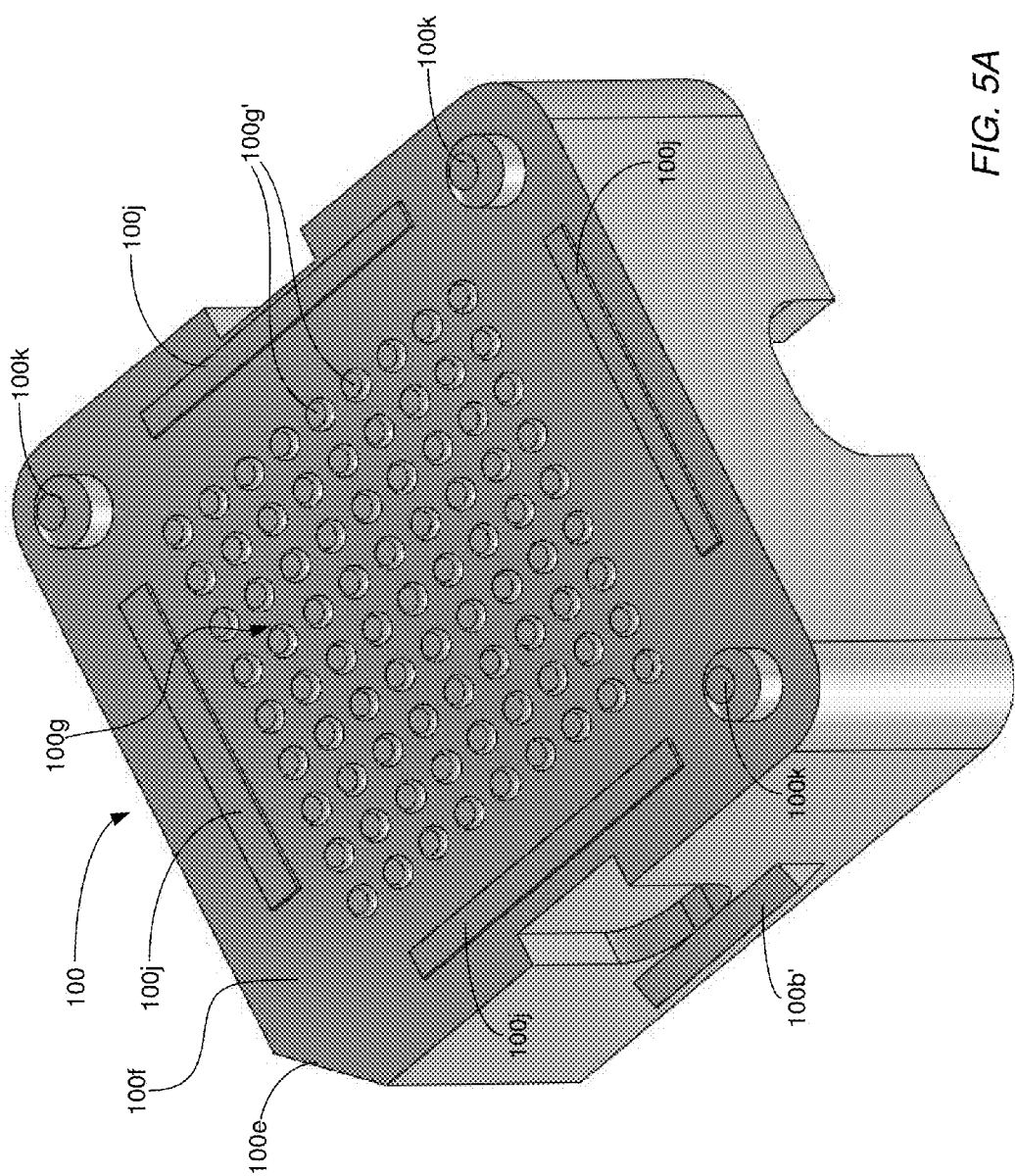
FIGS. 5A and 5B illustrate bottom and top perspective views, respectively, of the protective socket shown in FIG. 4.
Figure 5B:
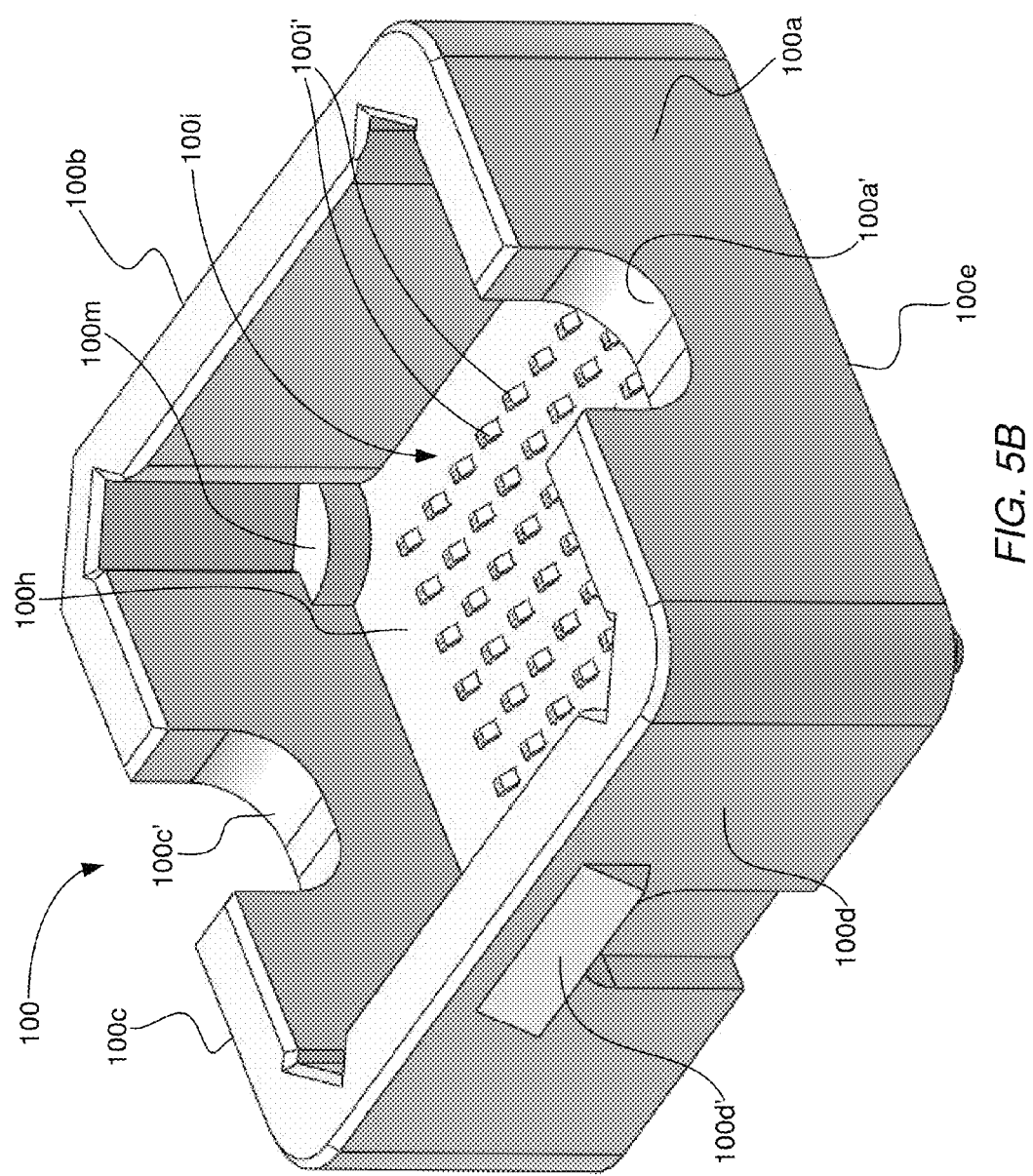

FIGS. 5A and 5B illustrate bottom and top perspective views of the protective socket 100 shown in FIG. 4. The bottom 100e has a bottom surface 100f on which an array 100g of electrical contacts 100g' are formed. The electrical contacts 100g' of the array 100g may be any type of suitable array of electrical contacts, such as, for example, an array of sprung-loaded contacts, a BGA, an array of solder bump contacts, or the like. In the illustrative embodiment shown in FIGS. 5A and 5B, the array 100g of electrical contacts 100g' is a BGA that comprises a plurality of electrically conductive solder balls 100g' arranged in an array 100g. The bottom 100e of the protective socket 100 has a top surface 100h on which an array 100i of electrically conductive spring fingers 100i' is disposed. Each of the spring fingers 100i' of the array 100i is connected through the bottom 100e to a respective electrically conductive ball 100g' of the BGA 100g.

When the parallel optical transceiver module 1 is seated within the protective socket 100 in the manner shown in FIG. 4, the electrical contacts (not shown for purposes of clarity) located on the bottom surface of the circuit board 70 (FIGS. 1-3) of the parallel optical transceiver module 1 are in contact with respective electrically conductive spring fingers 100i', and thus are electrically coupled to respective electrically conductive balls 100g' of the BGA 100g. As will be described below in more detail with reference to FIG. 6, the bottom surface 100f of the protective socket 100 is mounted on a system circuit board (not shown for purposes of clarity) in order to make electrical connections between the system circuit board and the electrical circuitry of the parallel optical transceiver module 1.

With reference again to FIG. 5A, the protective socket 100 has a plurality of stop bars 100j located on the bottom surface 100f adjacent the side walls 100a-100d. The stop bars 100j prevent the solder balls 100g' from being over-compressed during the soldering process when the balls 100g' are heated and placed in contact with the electrical contacts (not shown) located on the system circuit (not shown). Alignment posts 100k are placed at three of the corners of the protective socket 100 on the bottom 100e of the protective socket 100 for passively aligning the protective socket 100 with the system circuit board (not shown). It should be noted that the features 100b', 100d', 100j, and 100k are optional.

With reference again to FIG. 5B, the protective socket 100 includes three precisely-shaped corners 100m for passively aligning the electrical contacts on the lower surface of the circuit board 70 of the parallel optical transceiver module 1 with the spring fingers 100i' of the protective socket 100 when the module 1 is seated within the socket 100. The shaped corners 100m are also optional, as other types of alignment features and methods may be used for this purpose. The protective socket 100 is typically made of a molded plastic material, although other materials may be used to make the protective socket 100.

Figure 6:
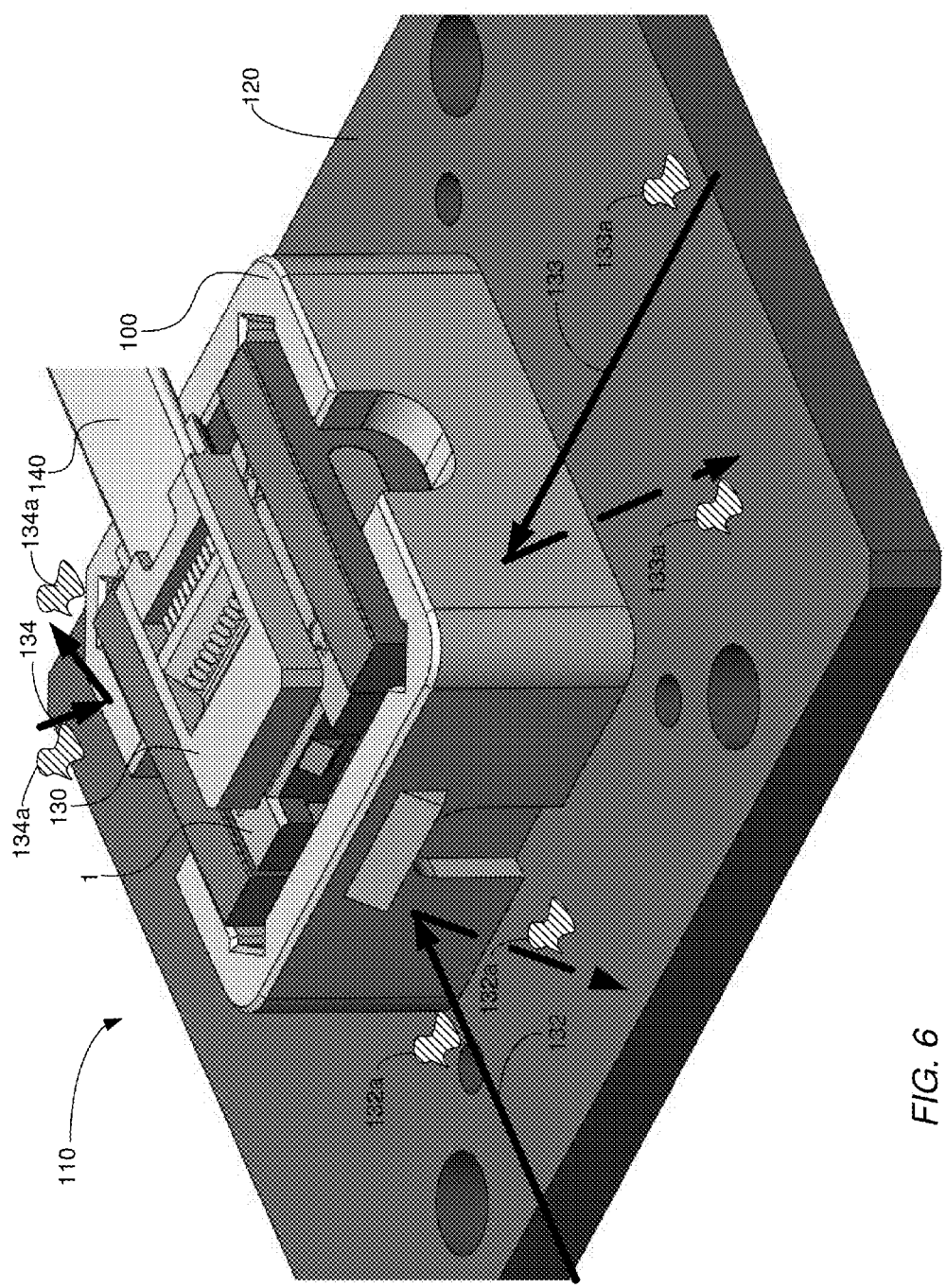
FIG. 6 illustrates a top perspective view of an optical communications system in accordance with an illustrative embodiment comprising a circuit board having the protective socket shown in FIGS. 5A and 5B mounted thereon, and the parallel optical transceiver module shown in FIGS. 1-3 secured within the protective socket.

FIG. 6 illustrates a top perspective view of an optical communications system 110 comprising the protective socket 100 mounted on a system circuit board 120 and having the parallel optical transceiver module 1 seated therein. In this mounted position of the protective socket 100, the electrically conductive balls 100g' of the BGA 100g are in contact with respective electrical contacts (not shown for purposes of clarity) of the system circuit board 120. An optical connector 130 is mechanically coupled with the parallel optical transceiver module 1 to couple light between ends of optical fibers of an optical fiber ribbon cable 140 and the active optical devices 60 (FIGS. 1 and 3). The invention is not limited with respect to the configurations of the optical connector 130 or the optical fiber ribbon cable 140. The arrows 132, 133 and 134 illustrate examples of air flows that are carrying airborne particles 132a, 133a and 134a, respectively, which are deflected off of the protective socket 100 to demonstrate the manner in which the protective socket 100 restricts, or impedes, the ingress of the airborne particles into an interior portion of the parallel optical transceiver module 1.

Figure 7:
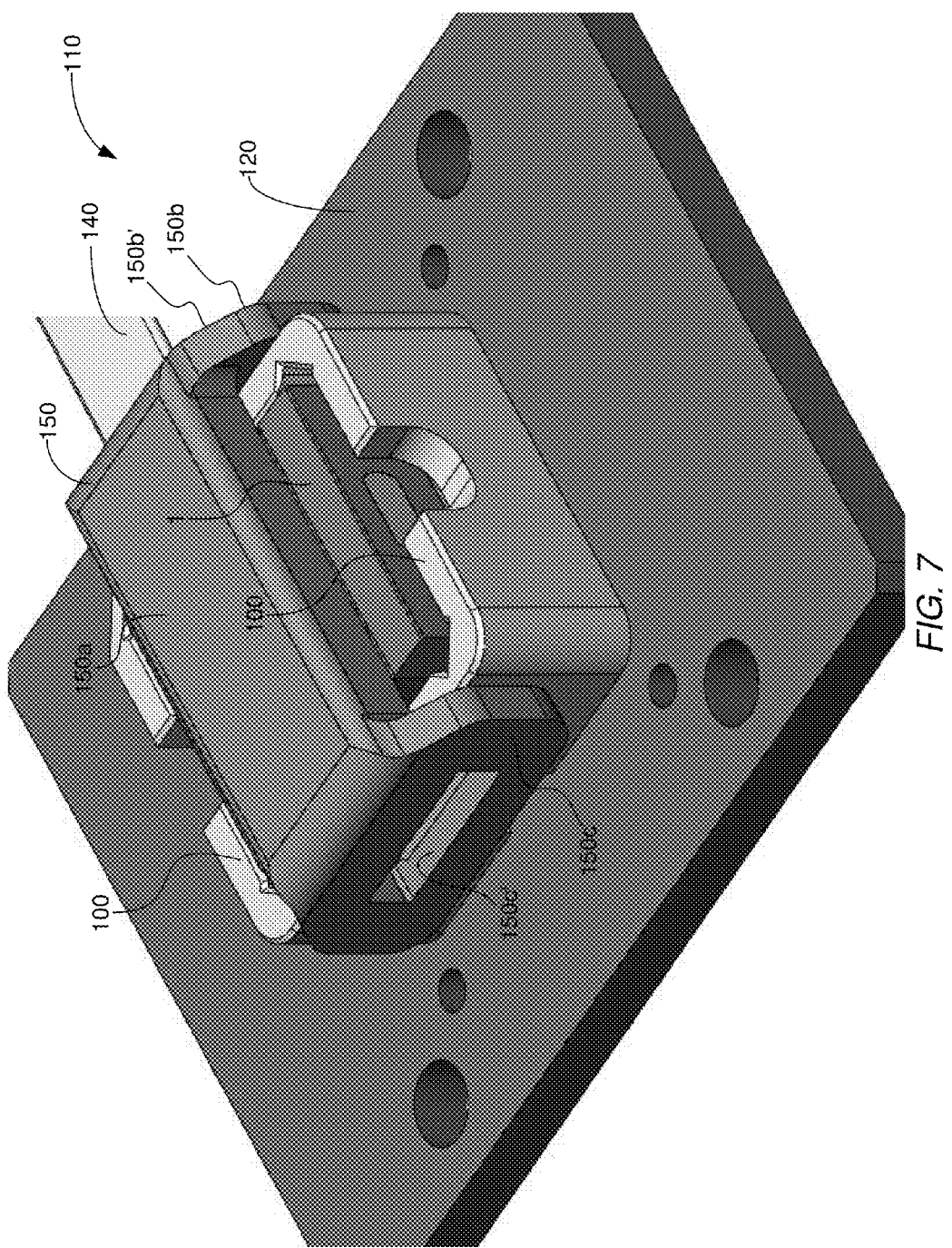
FIG. 7 illustrates a top perspective view of the optical communications system shown in FIG. 6 having a clip secured to the protective socket for further preventing the ingress of airborne matter into the parallel optical transceiver module.
Figure 8:
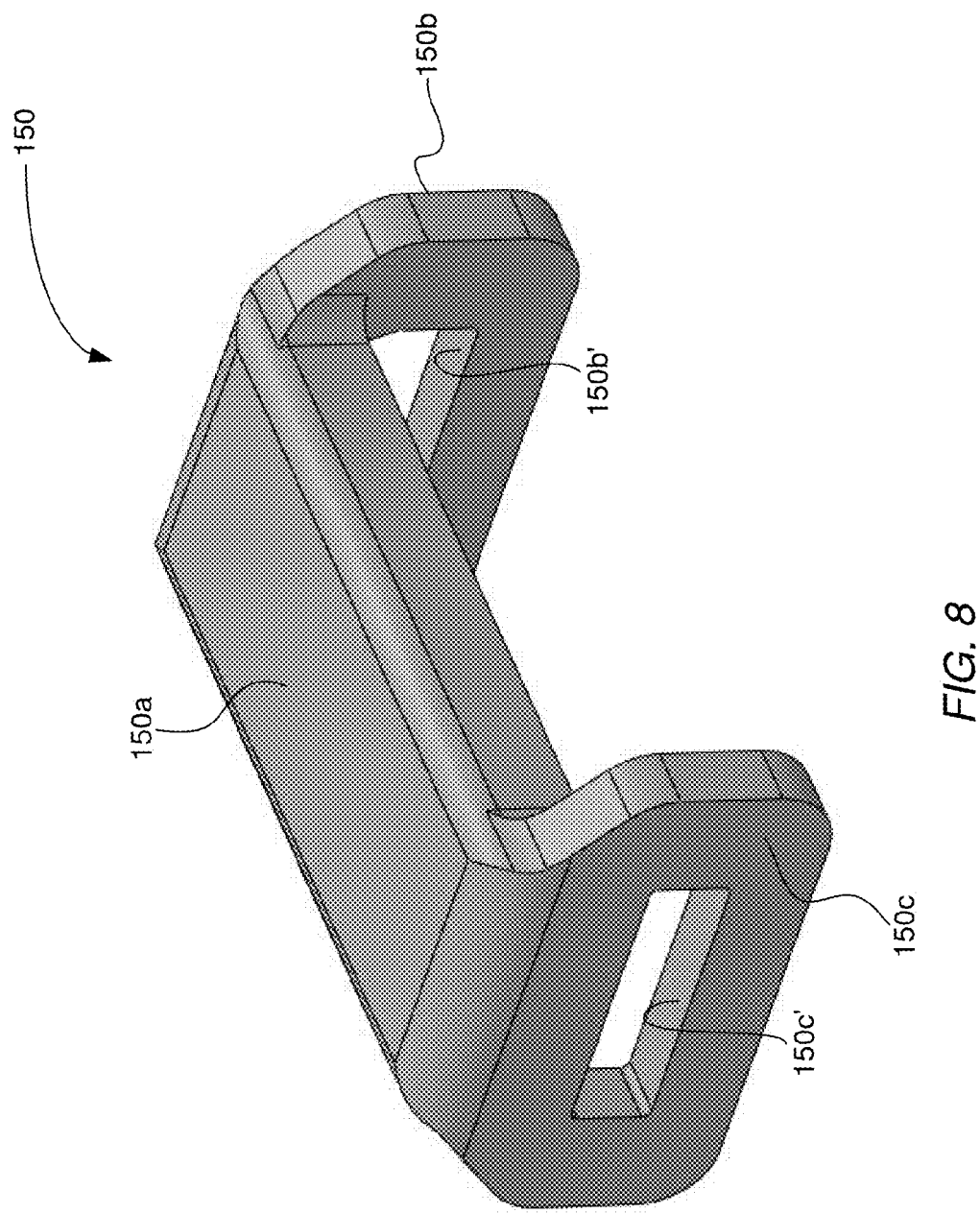
FIG. 8 illustrates a top perspective view of the clip shown in FIG. 7.
Figure 9:
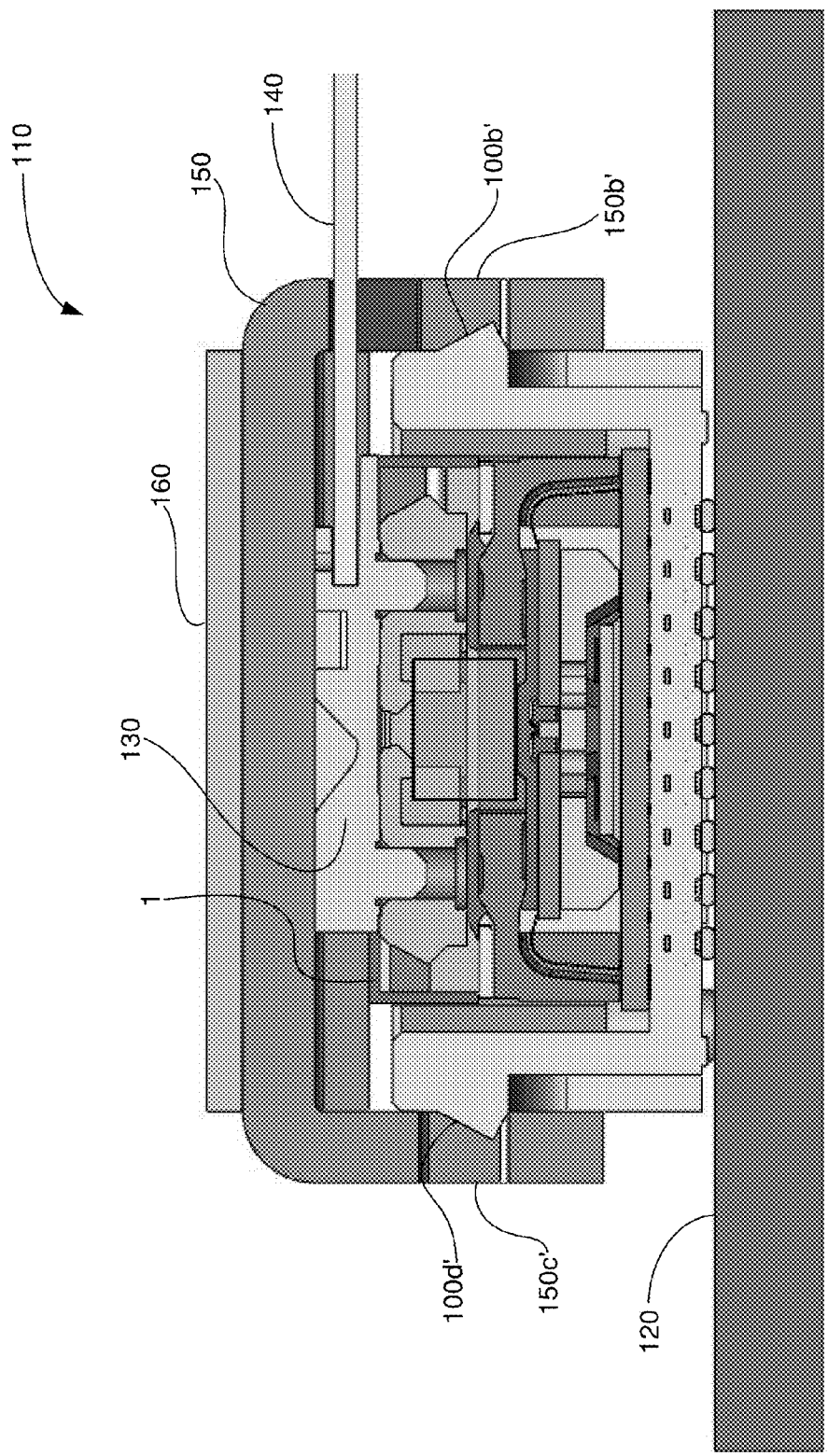
FIG. 9 illustrates a side cross-sectional view of the optical communications system shown in FIG. 7, which demonstrates the manner in which the clip helps prevent the ingress of airborne matter into the module.

FIG. 7 illustrates a top perspective view of the optical communications system 110 shown in FIG. 6 having a clip 150 secured to the protective socket 100 that serves dual purposes of providing additional material that further prevents ingress of airborne matter into the parallel optical transceiver module 1 and of providing a vertical constraining force that helps hold the optical connector 130 firmly in place on the parallel optical transceiver module 1. The clip 150 is typically made of a molded plastic material or sheet metal. FIG. 8 illustrates a top perspective view of the clip 150 shown in FIG. 7. FIG. 9 illustrates a side cross-sectional view of the optical communications system 110 shown in FIG. 6 having the clip 150 secured to the protective socket 100. The clip 150 has a top portion 150a and first and second side portions 150b and 150c, respectively. The side portions 150b and 150c have openings 150b' and 150c' formed therein that are configured to interlock with the latch features 100b' and 100d', respectively, shown in FIGS. 5A and 5B. In FIG. 9, a piece of a compressible material 160, such as foam or silicone, for example, has been placed on top of the top portion 150a of the clip 150 to allow a downward force to be placed on the clip 150 and optical connector 130 to help maintain the optical connector 130 in position. The use of the clip 150 and/or the use of the piece of compressible material 160 are optional.

Figure 10:
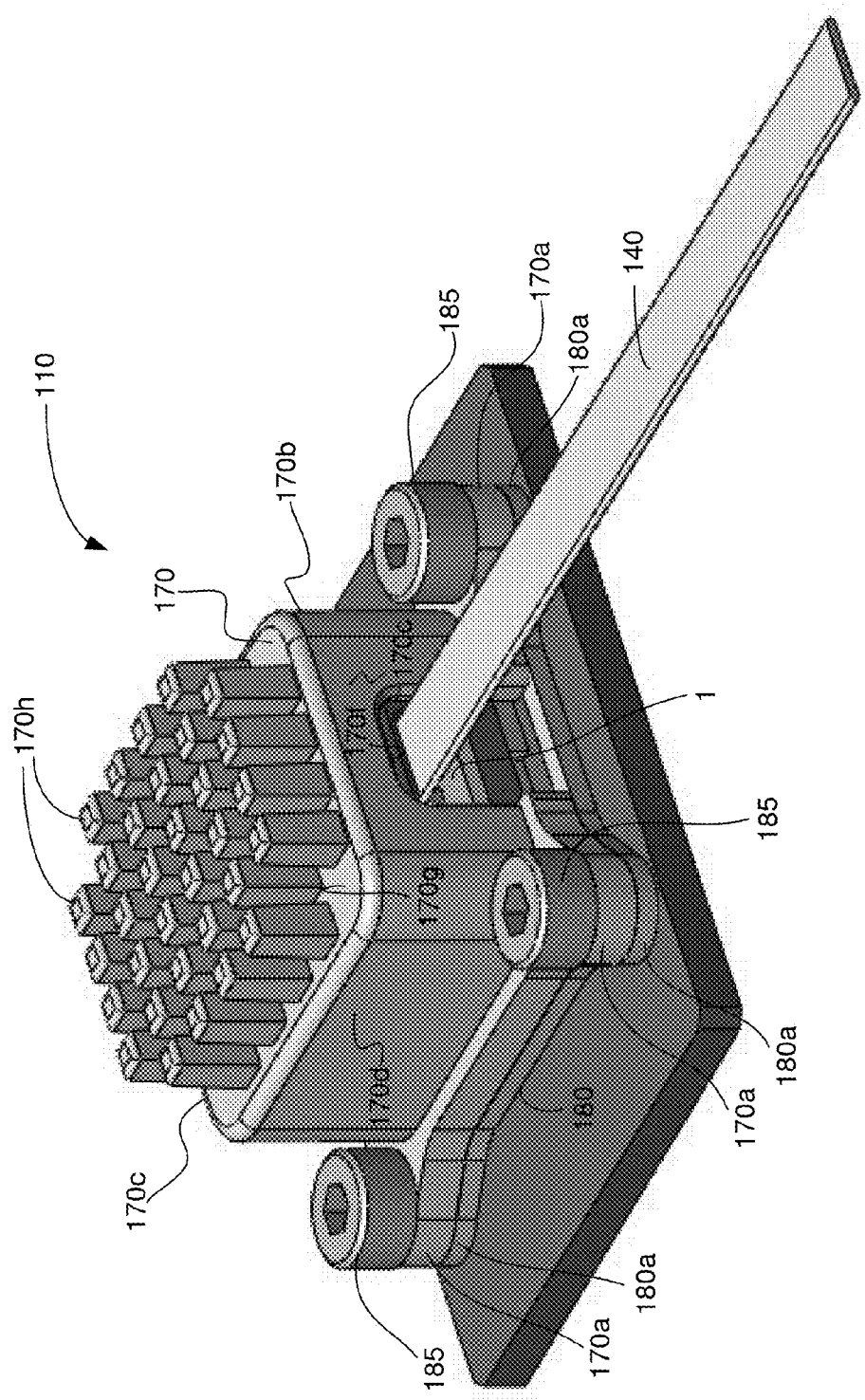
FIG. 10 illustrates a top perspective view of the optical communications system shown in FIG. 7 with an external heat sink device in accordance with an illustrative embodiment secured thereto for dissipating heat generated by components of the parallel optical transceiver module.

FIG. 10 illustrates a top perspective view of the optical communications system 110 shown in FIG. 7 having an external heat sink device 170 secured thereto in accordance with an illustrative embodiment. The external heat sink device 170 is secured to a gasket 180, which, in turn, is secured to the system circuit board 120. The gasket 180 helps to further seal off the parallel optical transceiver module 1 (FIG. 2) to prevent ingress of airborne matter into the parallel optical transceiver module 1. In addition, the gasket 180 provides a mounting surface that compensates for piece part tolerances of the external heat sink device 170.

The corners 180a of the gasket 180 and the corners 170a of the external heat sink device 170 have respective openings formed therein that are aligned with each other to allow respective fastening elements 185 to be inserted through the respective openings in the corners 170a/180a and secured to the system circuit board 120 to thereby secure the gasket 180 and the external heat sink device 170 to the system circuit board 120. If the gasket 180 is intended to help provide electromagnetic interference (EMI) shielding for the parallel optical transceiver module 1, then the gasket 180 will be made of an electrically conductive material such as metal. If the gasket 180 is intended to help prevent ingress of airborne matter into the parallel optical transceiver module 1, but not to provide EMI shielding, then the gasket 180 will typically be made of rubber.

The heat sink device 170 has three solid side walls 170b-170d and one side wall 170e that has an opening 170f formed therein through which the optical fiber ribbon cable 140 passes. Internal portions (not shown for purposes of clarity) of the external heat sink device 170 are in contact with the heat sink blocks 10 (FIG. 2) of the parallel optical transceiver module 1 (FIG. 2) to enable heat to be transferred from the parallel optical transceiver module 1 into the external heat sink device 170. An upper surface 170g of the external heat sink device 170 has fins 170h on it by which heat transferred into the external heat sink device 170 is dissipated into the air surrounding the fins 170h.

Figure 11:
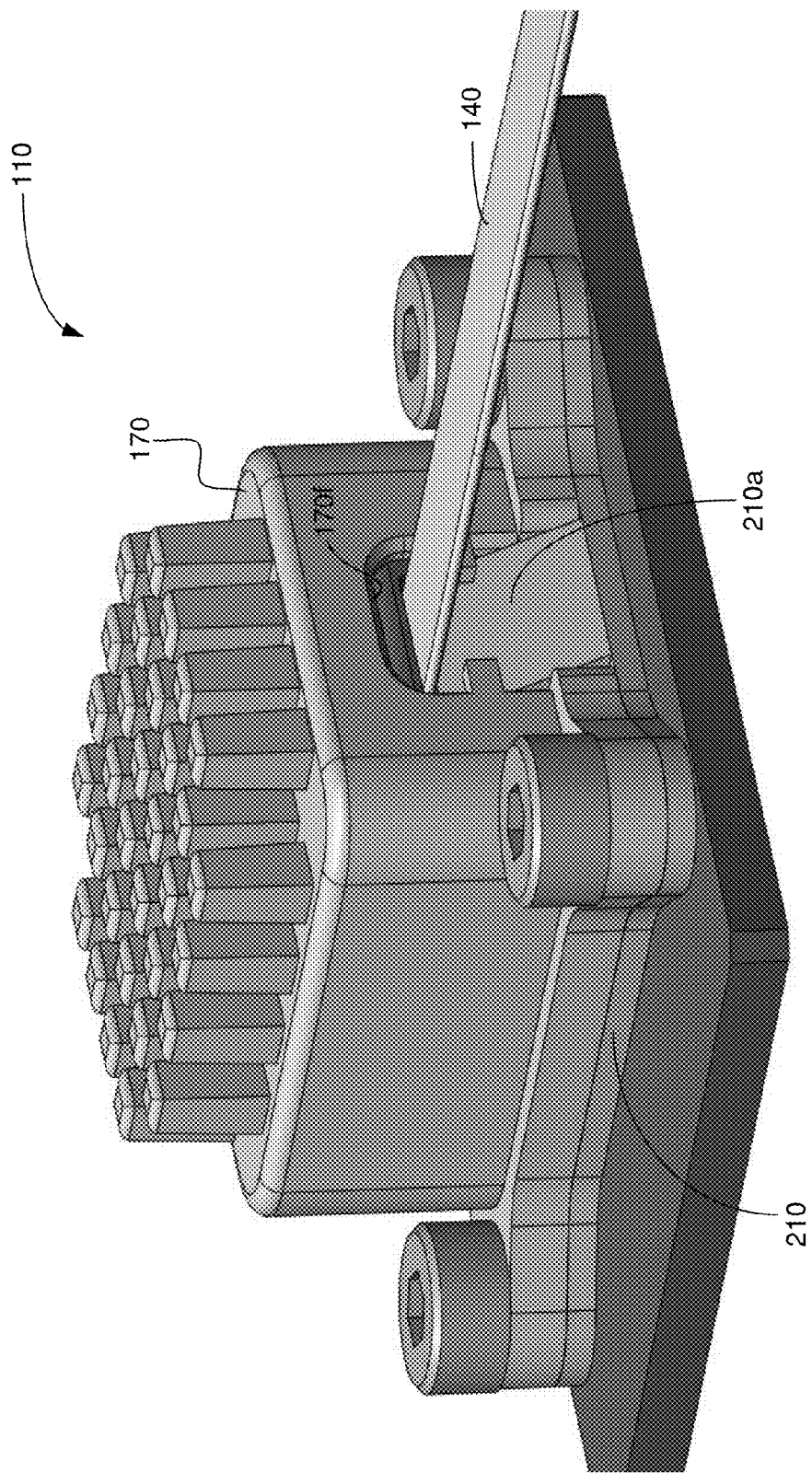
FIG. 11 illustrates a top perspective view of the optical communications system shown in FIG. 7 with an external heat sink device in accordance with another illustrative embodiment secured thereto for dissipating heat generated by components of the parallel optical transceiver module.

FIG. 11 illustrates a top perspective view of the optical communications system 110 shown in FIG. 10 with the gasket 180 replaced with a different gasket 210. The gasket 210 is identical to the gasket 180 except that the gasket 210 includes a tab 210a that can be folded up into the opening 170f to partially cover the opening 170f to help prevent ingress of airborne matter through the opening 170f into the parallel optical transceiver module 1 (FIG. 2). Alternatively, a piece of tape (not shown) or other material could be used to cover or fill the opening 170f. It should be noted that the invention is not limited with respect to the configuration of the external heat sink device 170 or gaskets 180, 210.

Figure 12:
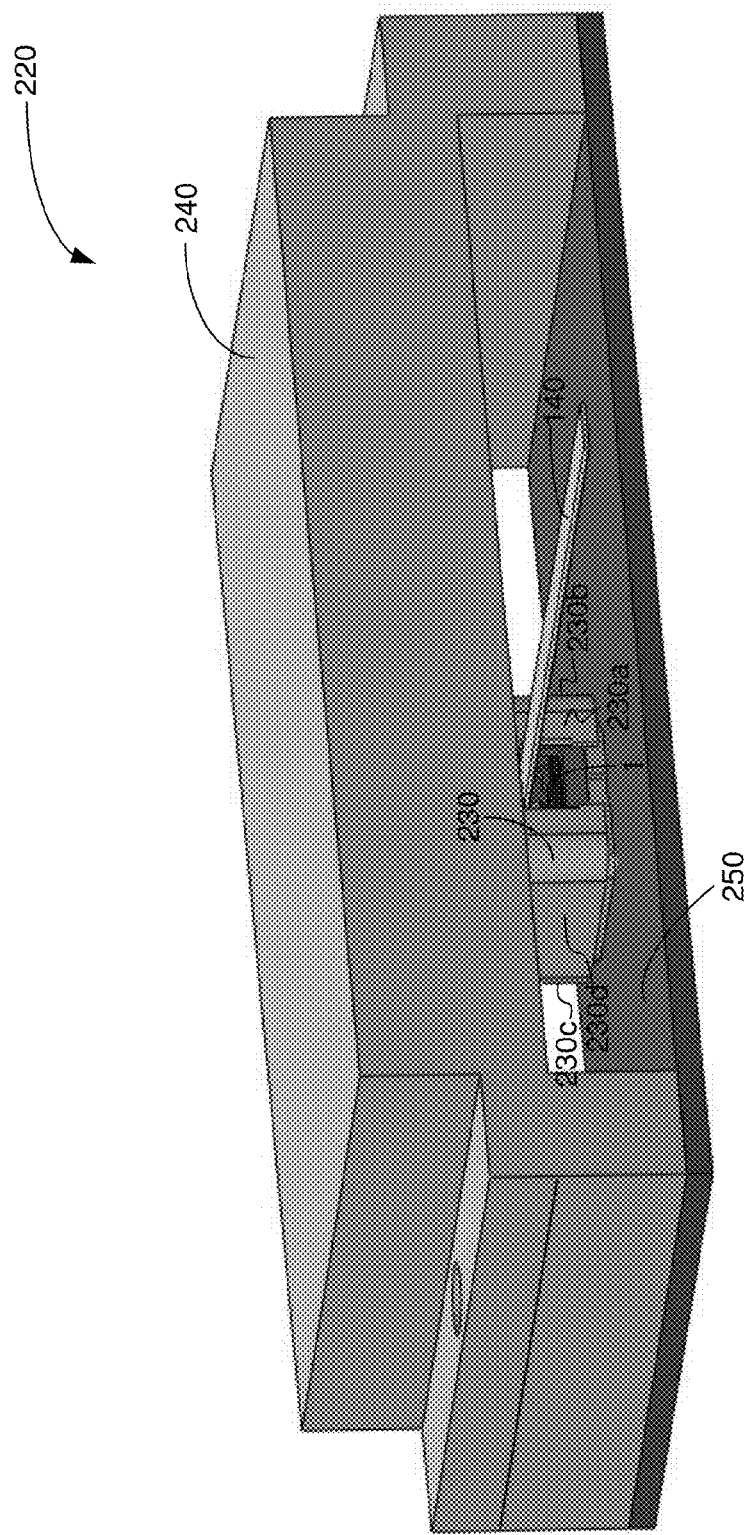
FIG. 12 illustrates a top perspective view of an optical communications system having an external heat sink device that has a protective socket such as that shown in FIGS. 5A and 5B that surrounds the parallel optical transceiver module shown in FIGS. 1-3.
Figure 13:
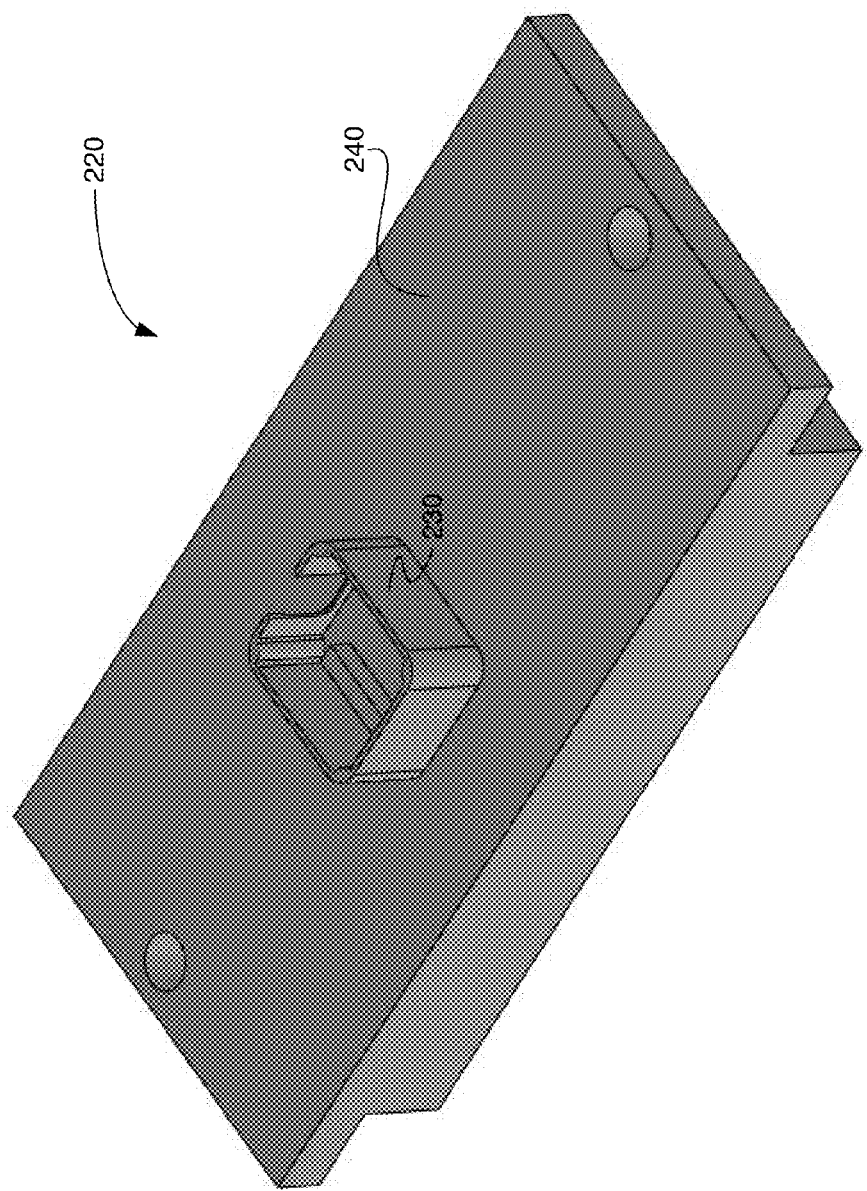
FIG. 13 illustrates a bottom perspective view of the external heat sink device shown in FIG. 12.

FIG. 12 illustrates a top perspective view of an optical communications system 220 in accordance with another illustrative embodiment in which a protective cover 230 for protecting the parallel optical transceiver module 1 from airborne matter is formed in an external heat sink device 240. FIG. 13 illustrates a bottom perspective view of the external heat sink device 240 shown in FIG. 12 when it is detached from a system circuit board 250 and flipped upside down to reveal the internal structure of the protective cover 230. The structure of the protective cover 230 shown in FIGS. 12 and 13 is substantially identical to the structure of the protective socket 100 shown in FIGS. 5A and 5B except that one side of the protective cover 230 is made up of a portion of the external heat sink device 240 rather than the BGA 100g (FIG. 5A).

The parallel optical transceiver module 1 that is covered by the protective cover 230 may be identical to the parallel optical transceiver module 1 shown in FIGS. 1-3. The circuit board 70 (FIGS. 1-3) of the parallel optical transceiver module 1 may be mounted directly on the system circuit board 250 or it may be mounted in an electrical socket (not shown for purposes of clarity) having electrical connections of the type shown in FIGS. 5A and 5B, which would then be mounted on the system circuit board 250. In the latter case, the electrical socket may have side walls that are similar to the side walls 100a-100d shown in FIGS. 5A and 5B except that the heights of the side walls of the electrical socket need not be as great as the height, H1, of the parallel optical transceiver module 1, as the side walls of the electrical socket would not be performing the function of preventing the ingress of airborne matter into the parallel optical transceiver module 1.

The protective cover 230 shown in FIGS. 12 and 13 performs the same functions described above with reference to FIGS. 4-5B of preventing or limiting the ingress of airborne matter into the parallel optical transceiver module 1. The side walls 230a-230d of the protective cover have a height that is approximately equal to the height H1 of the parallel optical transceiver module 1 such that the protective cover 230 at least substantially covers the parallel optical transceiver module 1. In this way, very few, if any, air gaps exist through which airborne matter can enter the parallel optical transceiver module 1.

It should be noted that the invention has been described with respect to illustrative embodiments for the purpose of describing the principles and concepts of the invention. The invention is not limited to these embodiments. As will be understood by those skilled in the art in view of the description being provided herein, many modifications may be made to the embodiments described herein while still providing a protective socket or cover that achieves the goals of the invention, and all such modifications are within the scope of the invention.

What is claimed is:

1. An optical communications system comprising:
    an optical transceiver module having at least first, second, third, and fourth outer sides, a top portion, and a bottom portion;
    a non-hermetically-sealing protective socket comprising a bottom and first, second, third, and fourth side walls, each of the side walls having a first side that is in contact with the bottom and having a second side that is parallel to the first side, the first side wall extending between the second and fourth side walls, the second side wall extending between the first and third side walls, the third side wall extending between the second and fourth side walls, the fourth side wall extending between the first and third side walls, the bottom having a bottom surface and a top surface, wherein a combination of the side walls and the bottom of the protective socket define a receptacle for holding the optical transceiver module, the receptacle having a length and a width that are slightly larger than a length and width, respectively, of the optical transceiver module to allow the optical transceiver module to be held within the receptacle, the receptacle having a height that is approximately equal to a height of the optical transceiver module, wherein the optical transceiver module is seated within the receptacle such that the bottom portion of the optical transceiver module is adjacent the top surface of the bottom of the protective socket and such that the first, second, third, and fourth outer sides of the optical transceiver module are surrounded by the first, second, third, and fourth side walls of the protective socket, and wherein the side walls and the bottom of the protective socket provide a physical barrier that impedes ingress of airborne particles into an interior portion of the optical transceiver module;
    a first array of electrical contacts disposed on the bottom surface of the protective socket; and
    a second array of electrical contacts disposed on the top surface of the bottom of the protective socket, wherein respective electrical contacts of the first array of electrical contacts are electrically coupled to respective electrical contacts of the second array of electricalcontacts, and wherein respective electrical contacts disposed on the bottom portion of the optical transceiver module are in contact with respective electrical contacts of the second array of electrical contacts.

2. The optical communications system of claim 1, wherein the first and second arrays of electrical contacts and the bottom of the protective socket comprise a ball grid array.

3. The optical communications system of claim 1, wherein the side walls and bottom of the protective socket are made of molded plastic.

4. The optical communications system of claim 1, further comprising:
    a system circuit board on which the protective socket is mounted, the system circuit board having electrical contacts thereon that are in contact with respective electrical contacts of the first array of electrical contacts of the protective socket.

5. The optical communications system of claim 4, further comprising:
    an external heat sink device secured to the system circuit board and surrounding the protective socket, wherein one or more portions of the external heat sink device are in contact with one or more heat sink blocks of the optical transceiver module.

6. The optical communications system of claim 1, further comprising:
    a clip having a first side portion, a second side portion and a top portion, the first and second side portions being mechanically coupled to the second and fourth side walls, respectively, of the protective socket, wherein the clip provides an additional physical barrier that impedes ingress of airborne particles into the interior portion of the optical transceiver module.

7. The optical communications system of claim 6, wherein an optical connector is connected to the top portion of the optical transceiver module and wherein a lower surface of the top portion of the clip is in contact with the optical connector and wherein the clip exerts a force on the optical connector that maintains the optical connector in position on the top portion of the optical transceiver module, the optical connector being connected to a first end of an optical fiber cable, the first end of the optical fiber cable passing through an opening formed in the first side portion of the clip.

8. The optical communications system of claim 7, wherein the clip is made of molded plastic.

9. The optical communications system of claim 7, wherein the clip is made of sheet metal.

10. The optical communications system of claim 7, further comprising:
    a system circuit board on which the protective socket is mounted, the system circuit board having electrical contacts thereon that are in contact with respective electrical contacts of the first array of electrical contacts of the protective socket.

11. The optical communications system of claim 10, further comprising:
an external heat sink device secured to the system circuit board and surrounding the protective socket, wherein one or more portions of the external heat sink device are in contact with one or more heat sink blocks of the optical transceiver module.

12. An optical communications system comprising:
an optical transceiver module, the optical transceiver module having at least first, second, third, and fourth outer sides, a top portion, and a bottom portion, the optical transceiver module having a height, H1, a width, W1, and a length, L2;
a non-hermetically-sealing protective socket comprising:
a bottom and first, second, third, and fourth side walls, each of the side walls having a first side that is in contact with the bottom and having a second side that is parallel to the first side, the first side wall extending between the second and fourth side walls, the second side wall extending between the first and third side walls, the third side wall extending between the second and fourth side walls, the fourth side wall extending between the first and third side walls, the bottom having a bottom surface and a top surface, wherein a combination of the side walls and the bottom of the protective socket define a receptacle in which the optical transceiver module is held, the receptacle having a height, H2, that is approximately equal to the height, H1, of the optical transceiver module, the receptacle having a width, W2, and a length, L2, that are slightly greater than the width, W1 and length, L1, respectively, of the optical transceiver module, wherein the optical transceiver module is seated within the receptacle of the protective socket such that the side walls of the protective socket and the bottom of the protective socket surround the outer sides and bottom portion of the optical transceiver module and provide a physical barrier that impedes ingress of airborne particles into an interior portion of the optical transceiver module;
a first array of electrical contacts disposed on the bottom surface of the bottom of the protective socket; and
a second array of electrical contacts disposed on the top surface of the bottom of the protective socket, wherein respective electrical contacts of the first array of electrical contacts are electrically coupled to respective electrical contacts of the second array of electrical contacts, and wherein respective electrical contacts disposed on the bottom portion of the optical transceiver module are in contact with respective electrical contacts of the second array of electrical contacts.

13. The optical communications system of claim 11, wherein the first and second arrays of electrical contacts and the bottom of the protective socket comprise a ball grid array.

14. The optical communications system of claim 11, wherein the side walls and bottom of the protective socket are made of molded plastic.

15. The optical communications system of claim 11, further comprising:
a system circuit board on which the protective socket is mounted, the system circuit board having electrical contacts thereon that are in contact with respective electrical contacts of the first array of electrical contacts of the protective socket.

16. The optical communications system of claim 15, further comprising:
an external heat sink device secured to the system circuit board and surrounding the protective socket, wherein one or more portions of the external heat sink device are in contact with one or more heat sink blocks of the optical transceiver module.

17. The optical communications system of claim 11, further comprising:
a clip having a first side portion, a second side portion and a top portion, the first and second side portions being mechanically coupled to the second and fourth side walls, respectively, of the protective socket, wherein the clip provides an additional physical barrier that impedes ingress of airborne particles into the interior portion of the optical transceiver module.

18. The optical communications system of claim 17, wherein an optical connector is connected to a top portion of the optical transceiver module and wherein a lower surface of the top portion of the clip is in contact with the optical connector and wherein the clip exerts a force on the optical connector that maintains the optical connector in position on the top portion of the optical transceiver module, the optical connector being connected to a first end of an optical fiber cable, the first end of the optical fiber cable passing through an opening formed in the first side portion of the clip.

19. The optical communications system of claim 18, wherein the clip is made of molded plastic.

20. The optical communications system of claim 18, wherein the clip is made of sheet metal.

21. The optical communications system of claim 18, further comprising:
an external heat sink device secured to the system circuit board and surrounding the protective socket, wherein one or more portions of the external heat sink device are in contact with one or more heat sink blocks of the optical transceiver module.

22. A method for impeding ingress of airborne particles into an optical transceiver module, the method comprising:
providing an optical transceiver module having a height, a width and a length, the optical transceiver module having at least first, second, third, and fourth outer sides, a bottom portion, and a top portion;
providing a non-hermetically-sealing protective socket having first, second, third, and fourth side walls and a bottom that together form a receptacle, the receptacle having a height, a width and a length, the protective socket having a first array of electrical contacts disposed on a bottom surface of the bottom of the protective socket and a second array of electrical contacts disposed on a top surface of the bottom of the protective socket; and
seating the optical transceiver module within the receptacle such that the bottom portion of the optical transceiver module is adjacent the top surface of the bottom of the protective socket and such that the first, second, third, and fourth outer sides of the optical transceiver module are surrounded by the first, second, third, and fourth aide walls of the protective socket, wherein respective electrical contacts of the first array of electrical contacts are electrically coupled to respective electrical contacts of the second array of electrical contacts, and wherein respective electrical contacts disposed on the bottom portion of the optical transceiver module are in contact with respective electrical contacts of the second array of electrical contacts, and wherein the length and width of the receptacle are slightly greater than the length and width, respectively, of the optical transceiver module, and wherein the height of the receptacle is approximately equal to the height of the optical transceiver module, and wherein the side walls and the bottom of the protective socket provide a physical barrier that impedes ingress of airborne particles into an interior portion of the optical transceiver module.

23. The method of claim 22, wherein the first and second arrays of electrical contacts and the bottom of the protective socket comprise a ball grid array.

24. The method of claim 22, further comprising:
providing a system circuit board on which the protective socket is mounted, the system circuit board having electrical contacts thereon that are in contact with respective electrical contacts of the first array of electrical contacts of the protective socket.

25. The method of claim 24, further comprising:
providing an external heat sink device secured to the system circuit board and surrounding the protective socket, wherein one or more portions of the external heat sink device are in contact with one or more heat sink blocks of the optical transceiver module.

26. The method of claim 22, further comprising:
providing a clip having a first side portion, a second side portion and a top portion, the first and second side portions being mechanically coupled to the second and fourth side walls of the protective socket, wherein the clip provides an additional physical barrier that impedes the ingress of airborne particles into the interior portion of the optical transceiver module.

27. The method of claim 26, wherein an optical connector is connected to a top portion of the optical transceiver module and wherein a lower surface of the top portion of the clip is in contact with the optical connector and wherein the clip exerts a force on the optical connector that maintains the optical connector in position on the top portion of the optical transceiver module, the optical connector being connected to a first end of an optical fiber cable, the first end of the optical fiber cable passing through an opening formed in the first side portion of the clip.

* * * * *